(12) United States Patent
Kern et al.

(10) Patent No.: US 12,339,148 B2
(45) Date of Patent: Jun. 24, 2025

(54) ULTRASONIC FLOW METER AND METHOD FOR ULTRASONIC FLOW METERING

(71) Applicant: Sciosense B.V., Eindhoven (NL)

(72) Inventors: Stefan Kern, Waghäusel (DE); Faik Coskunsu, Karlsruhe (DE)

(73) Assignee: Sciosense B.V., AE Eindhoven (NL)

( * ) Notice: Subject to any disclaimer, the term of this patent is extended or adjusted under 35 U.S.C. 154(b) by 354 days.

(21) Appl. No.: 17/905,812

(22) PCT Filed: Mar. 16, 2021

(86) PCT No.: PCT/EP2021/056703
§ 371 (c)(1),
(2) Date: Sep. 7, 2022

(87) PCT Pub. No.: WO2021/185847
PCT Pub. Date: Sep. 23, 2021

(65) Prior Publication Data
US 2023/0121980 A1  Apr. 20, 2023

(30) Foreign Application Priority Data

Mar. 20, 2020  (EP) .................................... 20164632

(51) Int. Cl.
*G01F 1/667* (2022.01)
(52) U.S. Cl.
CPC .................... *G01F 1/667* (2013.01)
(58) Field of Classification Search
None
See application file for complete search history.

(56) References Cited

U.S. PATENT DOCUMENTS

| | | | |
|---|---|---|---|
| 8,126,154 B2 | 2/2012 | Bierl et al. | |
| 10,495,502 B2 | 12/2019 | Ramanan et al. | |
| 2009/0290731 A1 | 11/2009 | Bierl et al. | |
| 2013/0205913 A1 | 8/2013 | Sørensen et al. | |
| 2015/0316400 A1 | 11/2015 | Wiest et al. | |
| 2017/0082471 A1 | 3/2017 | Ramanan et al. | |

FOREIGN PATENT DOCUMENTS

| | | |
|---|---|---|
| CN | 103229025 A | 7/2013 |
| CN | 106546296 A | 3/2017 |
| DE | 102012111427 A1 | 5/2014 |
| EP | 2581715 A1 | 4/2013 |
| WO | 2008028927 A1 | 3/2008 |

*Primary Examiner* — Daniel S Larkin
(74) *Attorney, Agent, or Firm* — Slater Matsil LLP

(57) ABSTRACT

In an embodiment an ultrasonic flow meter includes a first transducer and a second transducer, a first impedance circuit and a second impedance circuit, each of the first and second impedance circuits having a variable impedance, a first terminal coupled to the first transducer via the first impedance circuit, a second terminal coupled to the second transducer via the second impedance circuit, a signal generator with a signal output and a signal evaluation circuit with a signal input, wherein the signal output and the signal input are coupled to the first and second terminals, and wherein the signal evaluation circuit includes a time-to-digital converter and a first comparator that couples the signal input to a first input of the time-to-digital converter, and a control circuit that is coupled to the signal generator, the signal evaluation circuit and the variable impedance.

14 Claims, 10 Drawing Sheets

ULTRASONIC FLOW METER AND METHOD FOR ULTRASONIC FLOW METERING

The present patent application is the national stage entry of International Patent Application No. PCT/EP2021/056703, filed on Mar. 16, 2021, which claims the benefit of priority of European Patent Application No. 20164632.0, filed on Mar. 20, 2020, all of which are hereby incorporated by reference in their entirety for all purposes.

TECHNICAL FIELD

The present disclosure refers to an ultrasonic flow meter and to a method for ultrasonic flow metering.

BACKGROUND

An ultrasonic flow meter can be used, for example, to measure various parameters, such as a flow velocity, a flow rate or a flow volume of a medium, such as a fluid or a gas. Typically, an ultrasonic flow meter comprises a time-to-digital converter that measures a time-of-flight, ToF, of an ultrasonic signal between two points at which an ultrasonic source and an ultrasonic detector are located. The measurement relies on comparing the ToF of ultrasonic signals which have been induced into the medium along an upstream and/or a downstream direction of a flow. A transducer of the ultrasonic flow meter can be used as an ultrasonic source and also as an ultrasonic detector. The ultrasonic flow meter typically comprises a first and a second transducer which may show a small mismatch in their characteristics.

SUMMARY

Embodiments provide an ultrasonic flow meter and a method for ultrasonic flow metering that reduces the influence of a difference of transducer characteristics.

The definitions as described above also apply to the following description unless otherwise stated.

In an exemplary embodiment, an ultrasonic flow meter comprises a first and a second transducer, a first and a second impedance circuit comprising a variable impedance, a first terminal coupled to the first transducer via the first impedance circuit, a second terminal coupled to the second transducer via the second impedance circuit, a signal generator with a signal output and a signal evaluation circuit with a signal input. The signal output and the signal input are coupled to the first and the second terminal. The signal evaluation circuit comprises a time-to-digital converter and a first comparator that couples the signal input to a first input of the time-to-digital converter.

Moreover, the ultrasonic flow meter comprises a control circuit that is coupled to the signal generator, the signal evaluation circuit and the variable impedance. The control circuit is configured to set the ultrasonic flow meter in an upstream mode and in a downstream mode and to set an impedance value of the variable impedance as a function of a first upstream time signal generated by the time-to-digital converter in the upstream mode and of a first downstream time signal generated by the time-to-digital converter in the downstream mode.

Advantageously, the impedance value of the variable impedance can be selected to increase a matching of the first to the second transducer. Advantageously, the variable impedance improves symmetry of receive signals between the upstream mode and the downstream mode. The receive signals are received at the signal input. Thus, a receive signal optimization for the ultrasonic flow meter is achieved.

In an exemplary embodiment of the ultrasonic flow meter, the variable impedance is configured to obtain one impedance value out of a first number L of impedance values. This impedance value is determined in a calibration phase and used in a measurement phase following the calibration phase.

In an exemplary embodiment of the ultrasonic flow meter, the control circuit optimizes the impedance value of the variable impedance such that the first upstream time signal and the first downstream time signal are similar to each other in the measurement phase and differ mainly by a time difference DIFTOF. The time difference DIFTOF corresponds to a value of a flow velocity or a flow rate that is to be determined in the measurement phase.

In an exemplary embodiment of the ultrasonic flow meter, the time difference is zero or approximately zero in case of zero flow. The ultrasonic flow meter realizes a zero time difference at zero flow.

In an exemplary embodiment of the ultrasonic flow meter, in the upstream mode, the first comparator generates a first comparator signal with a second number K of pulses and the time-to-digital converter (abbreviated converter or TDC) generates the first upstream time signal with the second number K of values TOF_k_C1_1_UP corresponding to the second number K of pulses of the first comparator signal. The index k runs from 1 to K. The index 1 indicates the impedance value out of the first number L of impedance values and may have values between 1 and L.

In an exemplary embodiment of the ultrasonic flow meter, in the downstream mode, the first comparator generates the first comparator signal with the second number K of pulses and the time-to-digital converter generates the first downstream time signal with the second number K of values TOF_k_C1_1_DOWN corresponding to the second number K of pulses of the first comparator signal.

In an exemplary embodiment of the ultrasonic flow meter, the control circuit determines the time difference DIFTOF and an lth impedance value out of the first number L of possible impedance values at which the following sum f(l) obtains a minimum:

$$f(l) = \sum_{k=1}^{K} (\text{TOF\_k\_C1\_1\_UP} - \text{TOF\_k\_C1\_1\_DOWN} - \textit{DIFTOF})^2,$$

wherein TOF_k_C1_1_UP is a value of the first upstream time signal generated at the kth pulse of the second number K of pulses of the first comparator signal using the lth impedance value of the first number L of impedance values of the variable impedance in the upstream mode, and wherein TOF_k_C1_1_DOWN is a value of the first downstream time signal generated at the kth pulse of the second number K of pulses of the first comparator signal using the lth impedance value of the first number L of impedance values of the variable impedance in the downstream mode. Advantageously, at the minimum of the sum f(l) the best fit of the receive signals in the upstream mode and in the downstream mode is achieved and the impedance resulting in said minimum is the optimum impedance.

In an exemplary embodiment of the ultrasonic flow meter, the signal generator generates a square-wave or pulse signal having a third number N of pulses.

In an exemplary embodiment of the ultrasonic flow meter, the signal evaluation circuit comprises at least a second comparator that couples the signal input to at least a second input of the time-to-digital converter.

In an exemplary embodiment of the ultrasonic flow meter, the signal evaluation circuit comprises a fourth number M of comparators. The control circuit determines the time difference DIFTOF and the lth impedance value out of a first number L of possible impedance values at which the following sum f(l) obtains a minimum:

$$f(l) = \sum_{m=1}^{M} \left\{ \sum_{k=1}^{K} (\text{TOF\_k\_Cm\_l\_UP} - \text{TOF\_k\_Cm\_l\_DOWN} - DIFTOF)^2 \right\},$$

wherein TOF_k_Cm_l_UP is a value of the first upstream time signal generated at the kth pulse of the second number K of pulses of the mth comparator signal using the lth impedance value of the first number L of impedance values of the variable impedance in the upstream mode. TOF_k_Cm_l_DOWN is a value of the first downstream time signal generated at the kth pulse of the second number K of pulses of the mth comparator signal using the lth impedance value of the first number L of impedance values of the variable impedance in the downstream mode. The index k runs from 1 to K. The index m runs from 1 to M (thus Cm runs from C1 to CM). The index l may have values between 1 and L. The fourth number M of comparators couple the signal input to a fourth number M of inputs of the time-to-digital converter or to a fourth number M of time-to-digital converters. One value of the first number L of impedance values is the optimum value for a low mismatch.

In an exemplary embodiment of the ultrasonic flow meter, one of the first and the second impedance circuit includes the variable impedance with the impedance value that is set by the control circuit and the other of the first and the second impedance circuit is free of an impedance that has a variable impedance value. For example, the first impedance circuit includes the variable impedance with the impedance value that is set by the control circuit and the second impedance circuit has an impedance with a constant impedance value. Alternatively, the second impedance circuit includes the variable impedance with the impedance value that is set by the control circuit and the first impedance circuit has an impedance with a constant impedance value. Constant impedance value means that the impedance does not vary with time and/or is not set by a control signal. The variable impedance has the first number L of different impedance values.

In an alternative exemplary embodiment of the ultrasonic flow meter, the first impedance circuit comprise the variable impedance with the impedance value that is set by the control circuit. The second impedance circuit comprise a further variable impedance with a further impedance value that is set by the control circuit. The different values of the first impedance circuit and the different values of the second impedance circuit can be combined. Thus, the variable impedance and the further variable impedance together have the first number L of different impedance values.

In an exemplary embodiment of the ultrasonic flow meter, the first impedance circuit comprises a first capacitor with a first electrode connected to a first terminal of the first transducer and a second electrode connected to a second terminal of the first transducer. The second impedance circuit comprises a second capacitor with a first electrode connected to a first terminal of the second transducer and a second electrode connected to a second terminal of the second transducer. The first and/or the second capacitor may be implemented as variable impedance. An impedance value of the first and/or the second capacitor may be set by the control circuit. For example, in case the first capacitor can obtain l_1 different capacitance values and the second capacitor can obtain l_2 different capacitance values, the first number L is equal to l_1·l_2.

The first transducer may be an upstream transducer and the second transducer may be a downstream transducer.

In an exemplary embodiment, the ultrasonic flow meter comprises a switching circuit. The signal output of the signal generator and the signal input of the signal generator are coupled to the first and the second terminal by the switching circuit.

In an exemplary embodiment, a method for ultrasonic flow metering comprises operating a ultrasonic flow meter in an upstream mode and in a downstream mode by coupling a signal output of a signal generator and a signal input of a signal evaluation circuit to a first and a second terminal and setting an impedance value of a variable impedance by a control circuit as a function of a first upstream time signal generated by a time-to-digital converter in the upstream mode and of a first downstream time signal generated by the time-to-digital converter in the downstream mode. A first and a second impedance circuit comprises the variable impedance. The first terminal is coupled to a first transducer via the first impedance circuit and the second terminal is coupled to a second transducer via the second impedance circuit. The signal evaluation circuit comprises the time-to-digital converter and a first comparator that couples the signal input to a first input of the time-to-digital converter.

The method for ultrasonic flow metering may be implemented, e.g., by the ultrasonic flow meter, according to one of the exemplary embodiments defined above. Features and exemplary embodiments which are only described in connection with the ultrasonic flow meter may also be implemented by the method and vice versa.

In an exemplary embodiment of the method, in a calibration phase, the impedance value of the variable impedance is determined by the control circuit as a function of the first upstream time signal generated by the time-to-digital converter in the upstream mode and of the first downstream time signal generated by the time-to-digital converter in the downstream mode. More specifically, in the calibration phase a series of first upstream time signals and first downstream time signals with different impedance values of the variable impedance are performed to determine an optimum impedance value. In a measurement phase following the calibration phase, the control circuit sets the optimum impedance value and determines a time difference by performing a measurement in an upstream mode and a measurement in a downstream mode.

In an exemplary embodiment of the method, in the upstream mode a switching circuit couples the signal output to the first terminal and couples the signal input to the second terminal. In the downstream mode, the switching circuit couples the signal output to the second terminal and couples the signal input to the first terminal. The switching circuit is optional, because such a switching circuit is not necessarily required.

In an exemplary embodiment, the ultrasonic flow meter may be applied, e.g., for gas and water meters. Advantageously, the ultrasonic flow meter improves signal symmetry, thus reducing zero flow offset and simplifying production calibration. The ultrasonic flow meter is implemented without frequency domain signal processing. The ultrasonic flow meter automatically performs a receive signal optimization.

In an exemplary embodiment, the ultrasonic flow meter is based on comparisons of upstream and downstream time-of-flight (ToF) measurements. For such an ultrasonic flow meter, the usage of symmetrical signal transmission is advantageous, far beyond a feasible signal transducer pairing. The reason is that differences of upstream and downstream ToF signals down to 10-6% of the signal may be of interest for optimal zero flow offset behavior. The ultrasonic flow meter improves symmetrical behavior in order to optimize the receive signal for identical receive burst shape by direct comparison of a number of dedicated ToF values within said ToF signals.

In an exemplary embodiment, the ultrasonic flow meter optimizes utilization of the natural reciprocity of flow meter pipes at zero flow. The ultrasonic flow meter optimizes signal transmission by tuning of resistors and/or capacitances in the signal path. The ultrasonic flow meter using ToF measurements optimizes the shape of receive signals in time domain. The ToF system typically incorporates time-to-digital-converters (TDCs) which measure particular points in the receive signal curve, normally points at which the received voltage curve crosses a reference or comparator level or voltage.

In an exemplary embodiment of the ultrasonic flow meter, several reference levels or voltages are applied and the corresponding points from upstream and downstream measurements are compared. Despite a general shift in time, which is the actual time difference of ToF named DIFTOF, the differences of corresponding points for upstream and downstream measurement should be reduced to zero to achieve symmetrical signal shapes. The remaining common time difference DIFTOF is the actual meter signal, which should vanish at zero flow. However, the method works at any flow by permitting this time difference of ToFs and only optimizing the deviation of the time differences between corresponding measurement points. The method to approach vanishing differences and thus symmetrical signal shapes is to tune the variable impedance of the signal transmit path. This impedance uses parallel and series impedances like capacitors and resistors. The ultrasonic flow meter automatically optimizes its parameter settings.

In an exemplary embodiment, the ultrasonic flow meter performs an impedance tuning on flow meter front ends. The ultrasonic flow meter utilizes analog signal path tuning. It does this based on a pure time domain method, which is very power efficient. Advantageously, a zero flow offset performance is achieved and the ultrasonic flow meter operates at very low current. Advantages for users are simplified calibration and lower zero flow offset at very low current consumption.

In an exemplary embodiment, the ultrasonic flow meter improves symmetry of receive signals where the tuning method is in time domain and is based on ToF measurement results. The tuning goal is optimization of calculated time domain signal for best receive signal shape symmetry. The ToF values are generated at 1 . . . M different reference voltage levels. The signal balancing is achieved by front end impedance tuning. The time domain approach is very suitable for a time-to-digital controller. The ultrasonic flow meter is configured to vary send and receive impedances to achieve the same time domain properties for upstream and downstream receive signals.

BRIEF DESCRIPTION OF THE DRAWINGS

The following description of figures of exemplary embodiments may further illustrate and explain aspects of the ultrasonic flow meter and the method for ultrasonic flow metering. Devices and circuit parts with the same structure and the same effect, respectively, appear with equivalent reference symbols. In so far as devices or circuit parts correspond to one another in terms of their function in different figures, the description thereof is not repeated for each of the following figures.

DETAILED DESCRIPTION OF ILLUSTRATIVE EMBODIMENTS

Figure 1A:
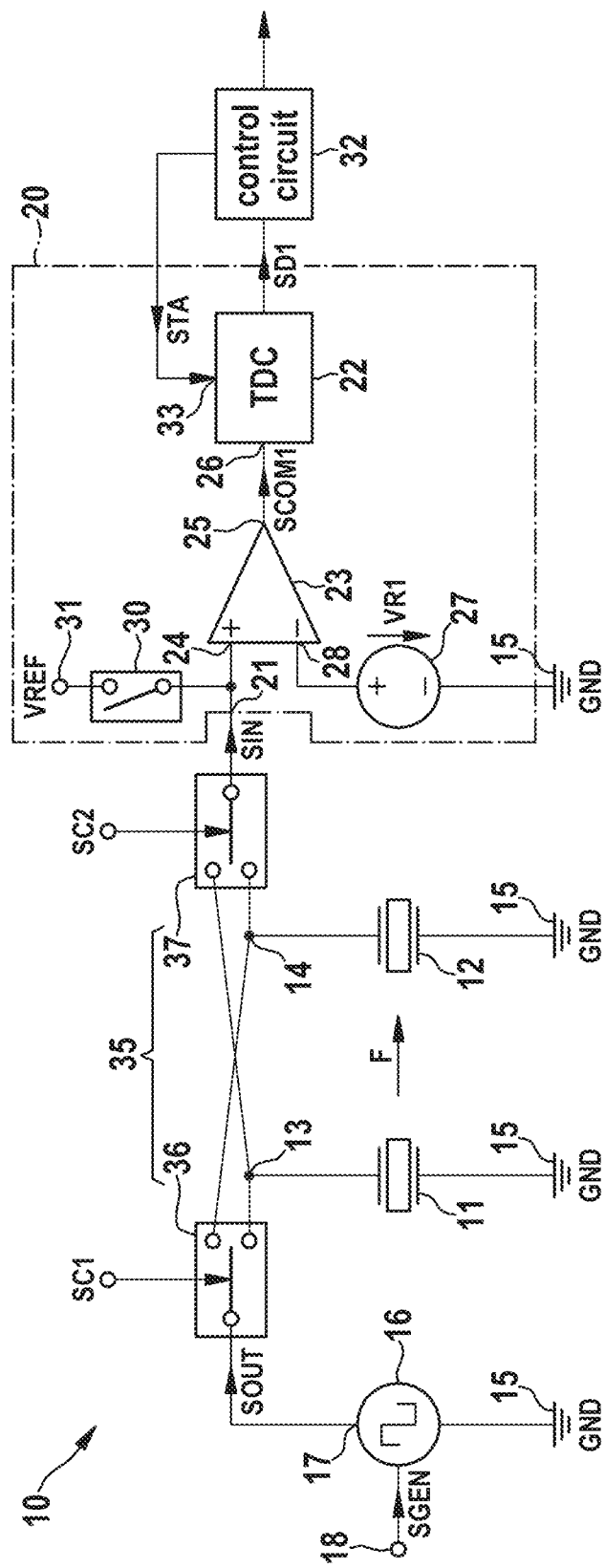
FIGS. 1A and 1B show an exemplary embodiment of an ultrasonic flow meter and of its signals.

FIG. 1A shows an exemplary embodiment of an ultrasonic flow meter 10 (abbreviated meter) that comprises a first and a second transducer 11, 12. The first and the second transducers 11, 12 are realized as ultrasonic transducers, for example, as piezoelectric transducers or capacitive transducers. Ultrasonic transducers convert AC current or AC voltage into ultrasonic sound, as well as the reverse. Piezoelectric transducers, such as piezoelectric crystals, change size and shape when a voltage is applied; an AC voltage makes them oscillate and produce the ultrasonic sound. Capacitive transducers use electrostatic fields between two electrodes such as a conductive diaphragm and a backing plate. Moreover, the meter 10 comprises a first and a second terminal 13, 14. The first terminal 13 is coupled to the first transducer 11 and the second terminal 14 is coupled to the second transducer 12. The first and the second transducers 11, 12 are also coupled to a reference potential terminal 15. Thus, the first terminal 13 is coupled to a first terminal of the first transducer 11. A second terminal of the first transducer 11 is connected to the reference potential terminal 15. Correspondingly, the second terminal 14 is coupled to a first terminal of the second transducer 12. A second terminal of the second transducer 12 is connected to the reference potential terminal 15.

Moreover, the meter 10 comprises a signal generator 16 having a signal output 17. The signal output 17 is coupled to the first and the second terminals 13, 14. The signal generator 16 has a further terminal connected to the reference potential terminal 15. Additionally, the signal generator 16 has a control input 18.

The meter 10 comprises a signal evaluation circuit 20 with a signal input 21. The signal input 21 is coupled to the first and the second terminals 13, 14. The signal evaluation circuit 20 comprises a time-to-digital converter 22, abbreviated converter or TDC, and a first comparator 23. A first input 24 of the first comparator 23 is coupled to the signal input 21. An output 25 of the first comparator 23 is coupled to a first input 26 of the converter 22. A first reference voltage source 27 of the evaluation circuit 20 couples a second input 28 of the first comparator 23 to the reference potential terminal 15. Moreover, the evaluation circuit 20 comprises a precharge switch 30 that couples a reference voltage terminal 31 to the signal input 21.

Furthermore, the meter 10 comprises a control circuit 32. The control circuit 32 may be coupled to the control input 18 of the signal generator 16 by a not-shown connection line. The control circuit 32 may be coupled to a start input 33 of the converter 22. The control circuit 32 may include a microprocessor or microcontroller.

Optionally, the meter 10 comprises a switching circuit 35 that couples the signal output 17 to the first and the second terminals 13, 14 and also couples the signal input 21 to the first and the second terminals 13, 14. Thus, the signal output 17 is alternatively coupled to the first or the second terminals 13, 14 and the signal input 21 is alternatively connected to the first or the second terminals 13, 14, namely to that of the two terminals 13, 14 that is not connected to the signal output 17 at this point of time.

The switching circuit 35 comprises a first changeover switch 36 having an input connected to the signal output 17 and two outputs connected to the first and the second terminals 13, 14. Moreover, the switching circuit 35 comprises a second changeover switch 37 having an output connected to the signal input 21 and two inputs connected to the first and the second terminals 13, 14. In an upstream mode A, the first changeover switch 36 connects the signal output 17 to the first terminal 13 and the second changeover switch 37 connects the second terminal 14 to the signal input 21. In a downstream mode B, the first changeover switch 36 connects the signal output 17 to the second terminal 14 and the second changeover switch 37 connects the first terminal 13 to the signal input 21.

The signal generator 16 generates an output signal SOUT at the signal output 17. At the signal input 21 a receive signal SIN can be tapped. A reference potential GND is tapped at the reference potential terminal 15. A generator control signal SGEN is provided to the control input 18 of the signal generator 16 by the control circuit 32. By the control circuit 32, a first control signal SC1 is provided to a control terminal of the first changeover switch 36 and a second control signal SC2 is provided to a control terminal of the second changeover switch 37. Depending on the first control signal SC1, the output signal SOUT is provided to the first or the second terminals 13, 14 via the first changeover switch 36. Depending on the second control signal SC2, a voltage tapped at the first terminal 13 or a voltage tapped at the second terminal 14 is provided via the second changeover switch 37 to the signal input 21 and thus to the first input 24 of the first comparator 23.

The first input 24 of the first comparator 23 is realized as a non-inverting input and the second input 28 of the first comparator 23 is implemented as an inverting input. A first comparator signal SCOM1 is provided by the first comparator 23 at the output 25 of the first comparator 23 and is applied to the first input 26 of the converter 22.

A first reference voltage VR1 is generated by the first reference voltage generator 27 and applied to the second input 28 of the first comparator 23. A start reference voltage VREF is applied to the reference terminal 31. If the precharge switch 30 is set in a conducting state by the control circuit 32, the start reference voltage VREF is provided to the first input 24 of the first comparator 23. This state may be realized, for example, before a start of operation of the meter 10.

It is also possible that the meter 10 is free of the switching circuit 35.

Figure 1B:
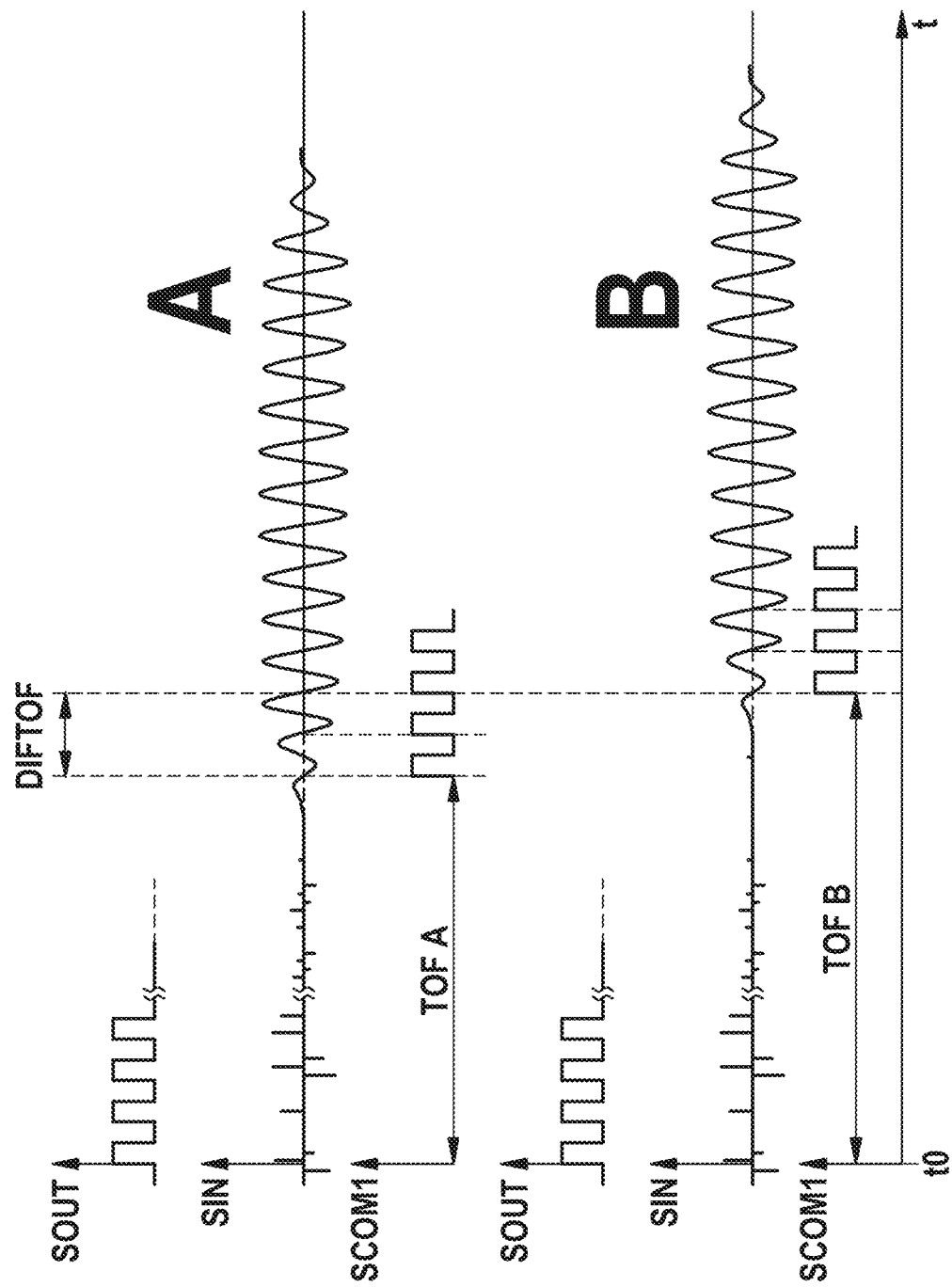

FIG. 1B shows exemplary signals of the meter 10 described in FIG. 1A. The signals are shown as a function of a time t. The upper three lines of FIG. 1B show the signals in the upstream mode A that may be an upstream measurement mode. The lower three lines show the signals in a downstream mode B that may be a downstream measurement mode. As indicated by an arrow F in FIG. 1A, the medium may flow in a direction from the first transducer 11 to the second transducer 12. In the upstream mode A, the first transducer 11 receives the output signal SOUT and the second transducer 12 generates the receive signal SIN. In the downstream mode B, the first transducer 11 generates the receive signal SIN and the second transducer 12 receives the output signal SOUT. The first and the fourth lines in FIG. 1B show the output signal SOUT, the second and the fifth lines show the receive signal SIN and the third and the sixth lines show the first comparator signal SCOM1.

The control circuit 32 may set the meter 10 into the upstream mode A in a first phase and then into the downstream mode B in a second phase. The second phase is after the first phase. Alternatively, the control circuit 32 may set the meter 10 into the downstream mode B in the first phase and then into the upstream mode A in the second phase.

The first comparator signal SCOM1 and the output signal SOUT are realized as pulse signals. The first comparator signal SCOM1 includes a second number K of pulses. The output signal SOUT comprises a third number N of pulses. The third number N shown in FIG. 1B is four. However, the third number N may be one, two, three or higher than four. For example, the third number N of pulses may be out of a range 1≤N≤100 or 10≤N≤40. Each pulse of the output signal SOUT may have a duty cycle of 50%. The series of pulses of the output signal SOUT may be named "fire burst". The start of the series of pulses of the output signal SOUT may be triggered by the generator control signal SGEN. The start of operation of the converter 22 is triggered by a start signal STA provided from the control circuit 32 to the start input 33. At the start of the series of pulses of the output signal SOUT, the converter 22 also starts, indicated with to in FIG. 1B. Thus, a point of time to of the start of the converter 22 may be equal to a rising edge of the first pulse of the output signal SOUT.

The receive signal SIN may also be named "receive wave". Due to the transmission of the ultrasonic wave in the medium, there is delay between the start of the output signal SOUT at to and the start of usable values of the receive signal SIN. There may be some disturbances in the receive signal SIN before the pulses generated by the first transducer 11 are detected by the second transducer 12. Due to the damping provided by the fluid and due to the characteristics of the first and the second transducer 11, 12, the receive signal SIN does not have the form of sharp pulses, but instead has waves similar to sine waves with a rising amplitude at the start and with a decreasing amplitude at the end of the series of waves.

The first comparator 23 generates the first comparator signal SCOM1 in the form of pulses using the receive signal SIN and the first reference voltage VR1 as inputs. The first comparator signal SCOM1 can be named "ToF hits". Typically, the second number K of pulses of the first comparator signal SCOM1 is higher than the third number N of pulses of the output signal SOUT. In the upstream mode A, the rising edge of the first pulse of the first comparator signal SCOM1 has a first delay TOFA with respect to the rising edge of the first pulse of the output signal SOUT. The first delay TOFA may be named "time-of-flight value" (abbreviated ToF value) in the upstream mode A.

In the downstream mode B, the output signal SOUT may have the same number of pulses, such as the output signal SOUT in the upstream mode A. The receive signal SIN first shows some disturbances before the pulses generated by the second transducer 12 arrive at the first transducer 11 and waves can be detected in the receive signal SIN. The output signal SOUT may be named "fire burst". A rising edge of the first pulse of the first comparator signal SCOM1 has a second delay TOFB with respect to a rising edge of the first pulse of the output signal SOUT. The second delay TOFB may be named "time-of-flight value" in the downstream mode B. The second delay TOFB is larger than the first delay TOFA in case of a flow in the direction or the arrow F. Thus, a time difference DIFTOF can be calculated according to the following equation:

$$DIFTOF = TOFB - TOFA$$

The time difference DIFTOF increases with increasing value of a flow velocity or a flow rate (e.g. linearly depends on said value). The time difference DIFTOF may also be named time offset or time shift. In the ideal case the time difference DIFTOF may be directly proportional to the value of the flow velocity or the flow rate. Moreover, in the ideal case the time difference DIFTOF may be zero or approximately zero in case of a zero flow rate.

The meter 10 is based on ToF measurements and uses the TDC 22 to measure zero crossings of the receive signal SIN. In an exemplary embodiment of the meter 10, taking the average over the measured zero crossings ("hits"), a difference between the measurement upstream and downstream, the so-called time difference DIFTOF, may be calculated. This time difference DIFTOF is a good measure for a flow value to be determined. A number of positive slopes of the first comparator signal SCOM1 can be defined as hits and taken for the average and the calculation of the time difference DIFTOF.

Figure 2A:
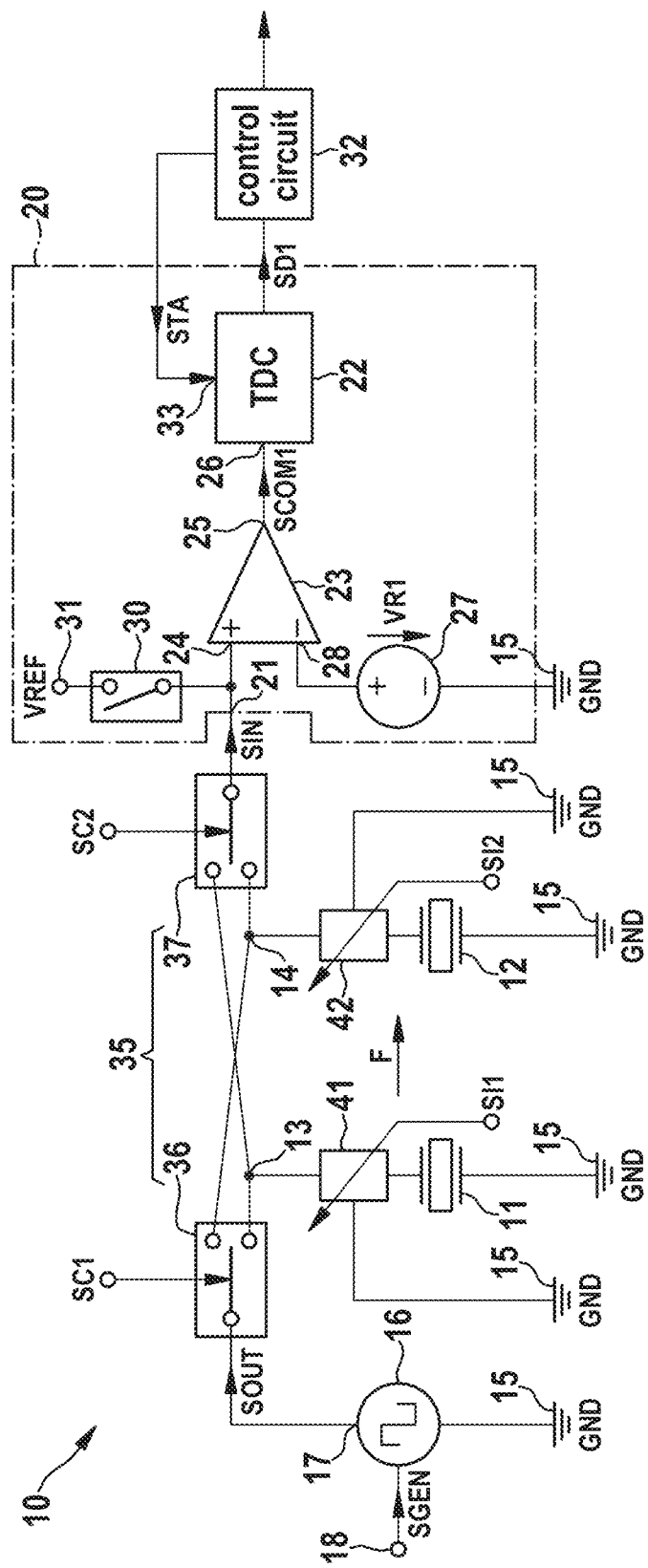
FIGS. 2A and 2B show a further exemplary embodiment of an ultrasonic flow meter and of its signals.

FIG. 2A shows a further exemplary embodiment of a meter 10 which is a further development of the exemplary embodiment shown in FIG. 1A. The meter 10 additionally comprises a first and a second impedance circuit 41, 42. The first impedance circuit 41 is coupled between the first terminal 13 and the first transducer 11. The second impedance circuit 42 is coupled between the second terminal 14 and the second transducer 12. Thus, one terminal of the first impedance circuit 41 is connected to the first terminal 13 and another terminal of the first impedance circuit 41 is connected to the first terminal of the first transducer 11. Correspondingly, one terminal of the second impedance circuit 42 is connected to the second terminal 14 and another terminal of the second impedance circuit 42 is connected to the first terminal of the second transducer 12. A further terminal of the first impedance circuit 41 and a further terminal of the second impedance circuit 42 may be connected to the reference potential terminal 15. The first impedance circuit 41 may be realized as a variable impedance. Also the second impedance circuit 42 may be realized as a variable impedance.

Thus, a first impedance control signal SI1 may be applied to a control terminal of the first impedance circuit 41. Similarly, a second impedance control signal SI2 may be provided to a control terminal of the second impedance circuit 42. Advantageously, the influence of a mismatch between the first and the second transducers 11, 12 can be reduced by the first and/or the second impedance circuits 41, 42. The first and/or the second impedance control signals SI1, SI2 are generated by the control circuit 32.

Figure 2B:
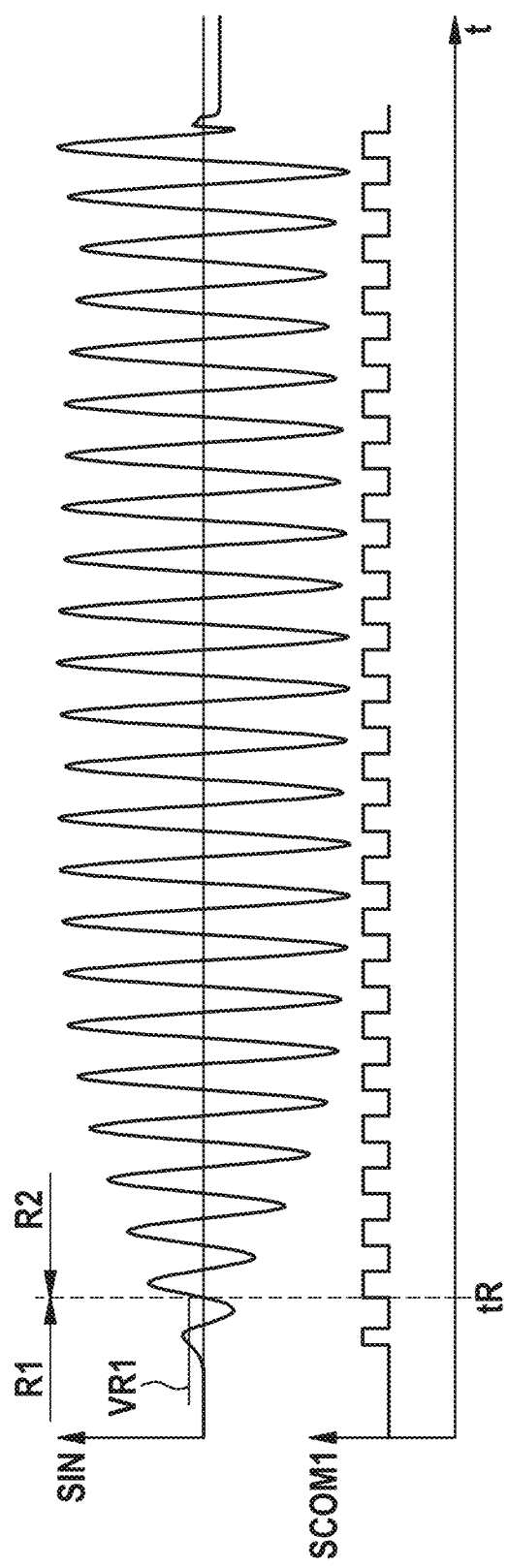

FIG. 2B shows an exemplary embodiment of signals which may be tapped at the meter 10 of FIG. 1A or 2A. The first reference voltage source 27 may generate the first reference voltage VR1 with two different values, namely VR or VR+ΔV. In a first receive phase R1, the first reference voltage VR1 has the value VR+ΔV and, in a second receive phase R2, the first reference voltage VR1 has the value VR. The value VR may be equal to zero (or to the reference potential GND). The value ΔV is a difference voltage which is different from zero and may obtain a small positive value.

After the start of the output signal SOUT the first reference voltage source 27 provides the first reference voltage VR1 with the value VR+ΔV. The first receive phase R1 ends and the second receive phase R2 starts at a point of time tR at which the first comparator signal SCOM1 obtains the second rise of a pulse. By the use of the first reference voltage VR1=VR+ΔV the influence of disturbances in the receive signal SIN on the first comparator signal SCOM1 are reduced in the first receive phase R1. Since in the second receive phase R2 the values of the receive signal SIN are higher due to the transmission of the pulses generated by the signal generator 16, the influence of disturbances is kept low and the first reference voltage VR1 can be equal to the reference potential GND.

In FIG. 2B, a sketch of a typical receive signal SIN and a typical first comparator signal SCOM1 in ultrasonic flow is shown. A complete measurement sequence features two such measurements, meters upstream and downstream. The meter 10 with TDC 22 features an optimization function that makes the pattern of upstream and downstream received time-domain hits similar to each other (with only the mentioned time difference DIFTOF remaining). The first comparator level VR1 is increased above zero to suppress noise signals, especially at the start.

Alternatively, the point of time tR of the transition between the first receive phase R1 and the second receive phase R2 may be set at the end of the first pulse of the first comparator signal SCOM1 or at another point of time.

Figure 3A:
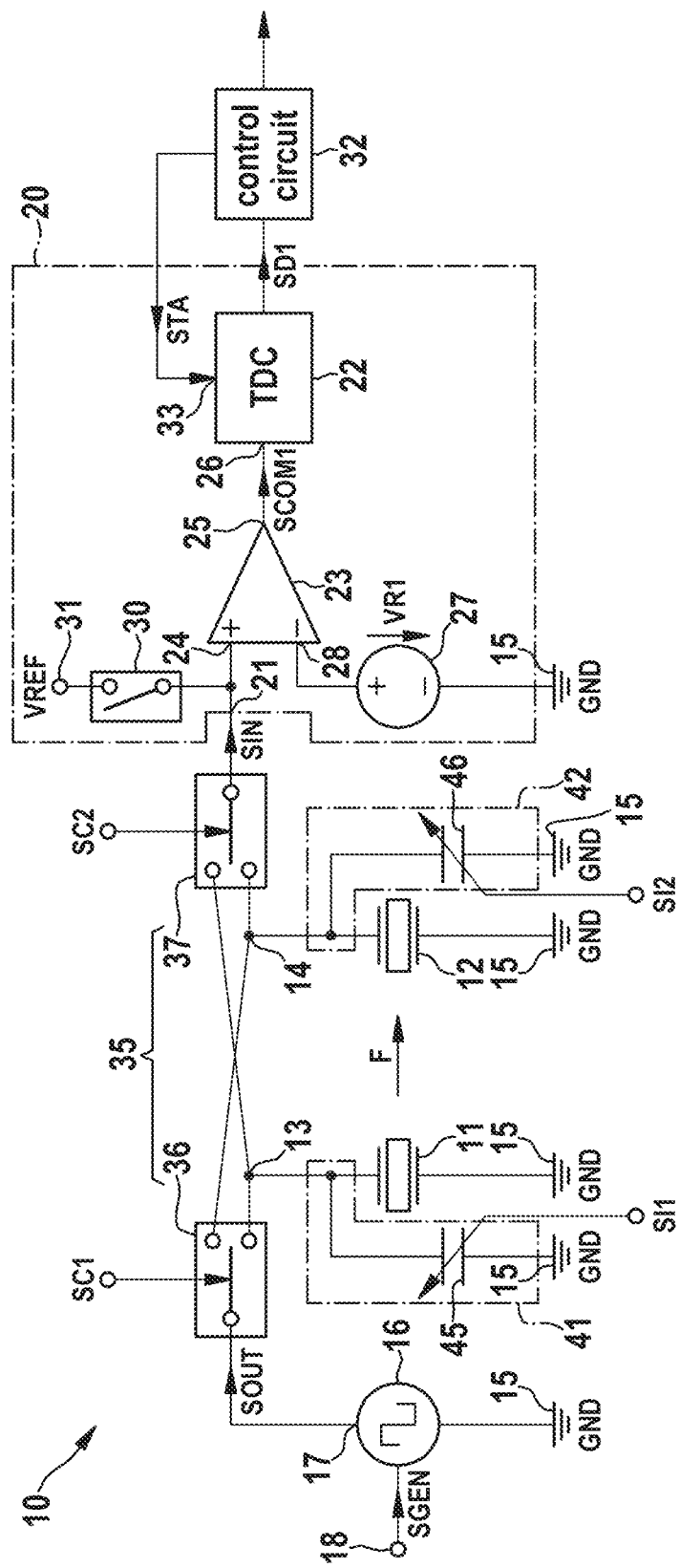
FIGS. 3A and 3B show an additional exemplary embodiment of an ultrasonic flow meter and of its signals.

FIG. 3A shows an additional exemplary embodiment of a meter 10 which is a further development of the exemplary embodiments shown in FIGS. 1A and 2A. The first impedance circuit 41 comprises a first capacitor 45. The second impedance circuit 42 comprises a second capacitor 46. The first capacitor 45 couples the first terminal 13 to the reference potential terminal 15. Similarly, the second capacitor 46 couples the second terminal 14 to the reference potential terminal 15. Thus, the first capacitor 45 is connected in parallel to the first transducer 11. Similarly, the second capacitor 46 is connected in parallel to the second transducer 12.

The first and/or the second capacitors 45, 46 may have a variable capacitance which is controllable. The first impedance control signal SI1 may be provided to a control terminal of the first capacitor 45. The second impedance control signal SI2 may be provided to a control terminal of the second capacitor 46. By the first and the second capacitors 45, 46 the resonance frequencies of the first and the second transducers 11, 12 can be adjusted. The first and the second capacitors 45, 46 are implemented as variable impedances. A capacitance value of the first and/or the second capacitors 45, 46 is set by the control circuit 32.

Figure 3B:
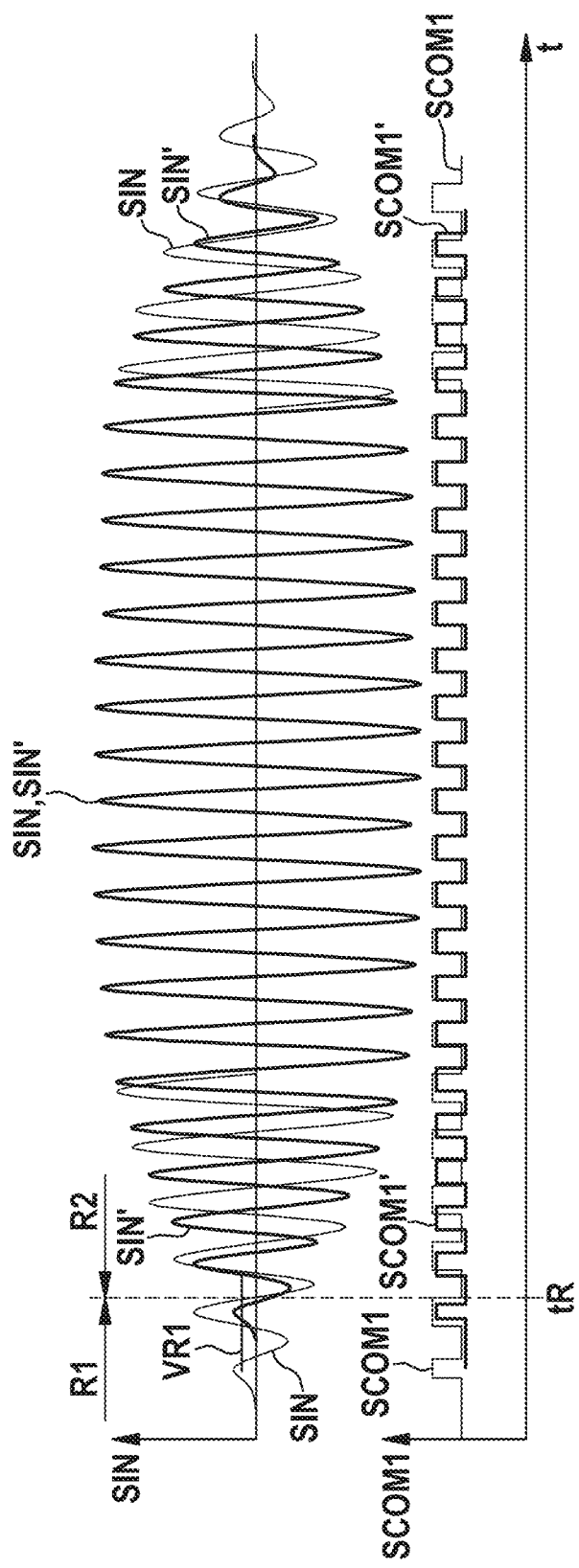

FIG. 3B shows an exemplary embodiment of signals of the meter 10 as shown in FIG. 3A. The first reference voltage VR1 can be named "zero cross level". In FIG. 3B the receive signal SIN, a further receive signal SIN', the first comparator signal SCOM1 and a further comparator signal SCOM1' are shown. The further comparator signal SCOM1' is generated by the first comparator 23 as a function of the further receive signal SIN1'. The two different receive signals SIN and SIN' are both generated, for example, in the upstream mode A. The difference between the two receive signals SIN and SIN' results from a change of capacitance values of the first and/or the second capacitors 45, 46 between the two measurements. The receive signal SIN comprises more pulses than the further receive signal SIN'. This may result from a better matching of the first and the second transducers 11, 12 achieved by the first and the second impedance circuits 41, 42 in the case of the generation of the receive signal SIN in comparison to the generation of the further receive signal SIN'. The first and the second impedance circuits 41, 42 may realize a simple but efficient resonance frequency tuning.

Figure 4A:
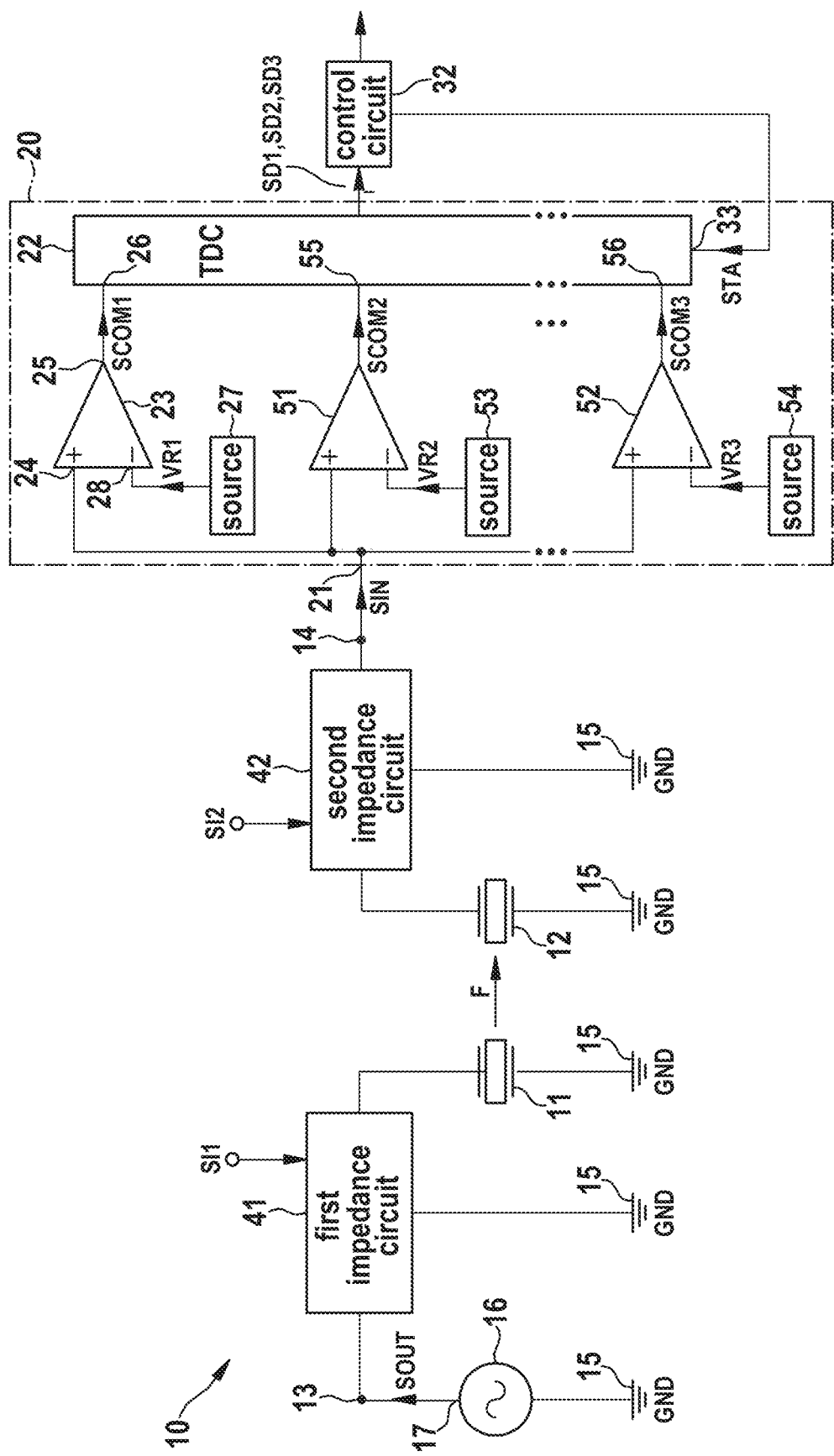
FIGS. 4A to 4D show other exemplary embodiments of an ultrasonic flow meter and of its signals.

FIG. 4A shows a further exemplary embodiment of a meter 10 which is a further development of the above-shown exemplary embodiments. The signal generator 16 is coupled via the first terminal 13 and the first impedance circuit 41 to the first transducer 11. Additionally, the second transducer 12 is coupled via the second impedance circuit 42 and the second terminal 14 to the signal input 21. The meter 10 is free from a switching circuit. The signal generator 16 is realized as an AC voltage generator. The output signal SOUT has the form of sine waves. The first transducer 11 may be named "fire down transducer" and the second transducer 12 may be named "fire up transducer".

The signal evaluation circuit 20 comprises a fourth number M of comparators 23, 51, 52. In the exemplary embodiment shown in FIG. 4A, the fourth number M of comparators is three. Alternatively, the fourth number M of comparators may also be one as shown in FIG. 1A, 2A and 3A or two or larger than three. The signal evaluation circuit 20 additionally comprises a fourth number M of reference voltage sources 27, 53, 54. Each of the fourth number M of comparators 23, 51, 52 is connected at its first input to the signal input 21. Each of the fourth number M of comparators 23, 51, 52 is connected at its second input to one of the fourth number M of reference voltage sources 27, 53, 54. The outputs of the fourth number M of comparators 23, 51, 52 are connected to a fourth number M of inputs 26, 55, 56 of the converter 22. Thus, a second comparator 51 is connected on its output side to a second input 55 of the converter 22. A third comparator 52 is connected on its output side to a third input 56 of the converter 22.

The fourth number M of reference voltage sources 27, 53, 54 provide a fourth number M of reference voltages VR1, VR2, VR3 which have different values. The first reference voltage VR1 may have the values shown in FIG. 2B. A second reference voltage VR2 tapped at the second reference voltage source 53 is different from the reference potential GND. The third reference voltage VR3 is different from the reference potential GND and may have the same sign as the second reference voltage VR2 or may have an opposite sign. In the case that the fourth number M is three or larger than three, the fourth number M of reference voltages VR1 to VR3 may have opposite signs.

The fourth number M of comparators 23, 51, 52 generate a fourth number M of comparator signals SCOM1 to SCOM3. Advantageously, positive half waves and negative half waves trigger pulses in the different comparator signals SCOM1 to SCOM3. The converter 22 generates a first time signal SD1 at each pulse of the first comparator signal SCOM1, for example, at each rising edge or each falling edge of a pulse of the first comparator signal SCOM1. The values of the first time signal SD1 represent the times between the start signal STA and the pulses of the first comparator signal SCOM1. Additionally, the converter 22 generates a second time signal SD2 including the values generated after receiving the pulses of the second comparator signal SCOM2. Also, the converter 22 generates a third time signal SD3 including the values generated after receiving the pulses of the third comparator signal SCOM3. The first, second and third time signals SD1, SD2, SD3 are provided to the control circuit 32. The time signals SD1 to SD3 are digital signals.

As indicated by the dots shown in FIG. 4A, the signal evaluation circuit 20 may comprise further comparators and further reference voltage generators. The proposed method can work with any number of comparators and may benefit, e.g., from high numbers; three comparator are just shown for explanation. A single TDC 22 can be used to detect hits at different levels or reference voltages VR1 to VR3.

It is also possible that the signal generator 16 is implemented as a pulse generator, such as shown in FIGS. 1A, 2A and 3A.

Figure 4B:
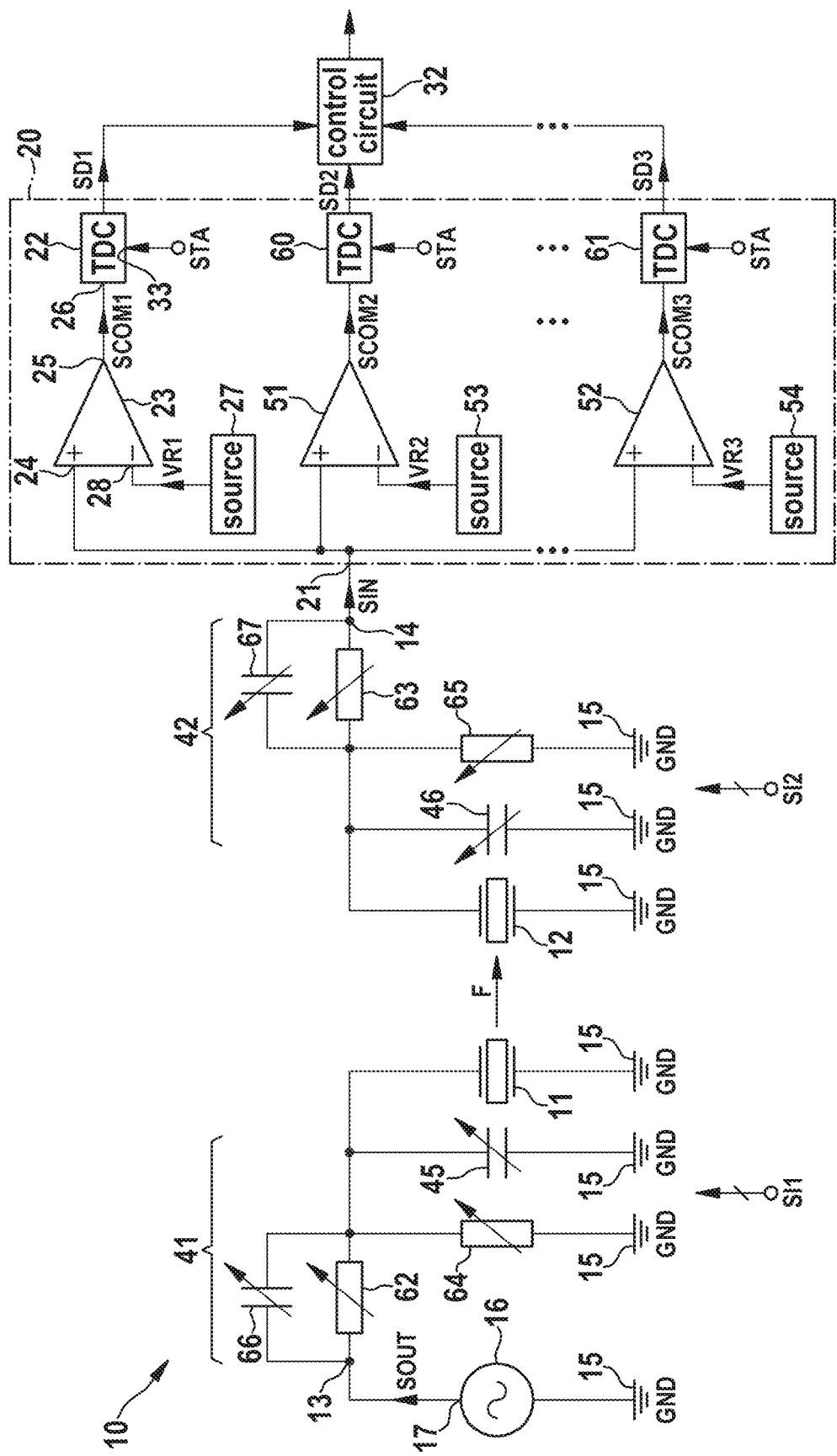

FIG. 4B shows an alternative exemplary embodiment of a meter 10 which is a further development of the above-shown exemplary embodiments. The signal evaluation circuit 20 comprises a fourth number M of time-to-digital converters 22, 60, 61. The fourth number M of comparators 23, 51, 52 are connected on their output sides to the fourth number M of time-to-digital converters 22, 60, 61. For example, the signal evaluation circuit 20 comprises a second and a third time-to-digital converter 60, 61. The second time-to-digital converter 60 is connected on its input side to the output of the second comparator 51. Similarly, the third time-to-digital converter 60 is connected on its input side to the output of the third comparator 52. Each of the fourth number M of time-to-digital converters 22, 60, 61 has a start input 33 and receives the same start signal STA.

The first impedance circuit 41 comprises the first capacitor 45 that couples the first terminal of the first transducer 11 to the reference potential terminal 15. Moreover, the first impedance circuit 41 comprises a first resistor 62 coupling the first terminal of the first transducer 11 to the first terminal 13. Correspondingly, the second impedance circuit 42 comprises the second capacitor 46 that couples the first terminal of the second transducer 12 to the reference potential terminal 15. Moreover, the first impedance circuit 41 comprises a second resistor 63 coupling the first terminal of the second transducer 12 to the second terminal 14.

Additionally, the first impedance circuit 41 comprises a third resistor 64 coupling the first terminal of the first transducer 11 to the reference potential terminal 15. The second impedance circuit 42 comprises a fourth resistor 65 coupling the first terminal of the second transducer 12 to the reference potential terminal 15.

Furthermore, the first impedance circuit 41 includes a third capacitor 66 that couples the first terminal of the first transducer 11 to the first terminal 13. The second impedance circuit 42 includes a fourth capacitor 67 that couples the first terminal of the second transducer 12 to the second terminal 14.

The first to the fourth capacitors 45, 46, 66, 67 may be controlled by impedance control signals generated by the control circuit 32. The first to the fourth resistors 62 to 65 may be controlled by impedance control signals generated by the control circuit 32.

Thus, a variable impedance of the first impedance circuit 41 is realized by at least one element of a group consisting of the first and the third capacitors 45, 66 and the first and the third resistor 62, 64. A variable impedance of the second impedance circuit 42 is realized by at least one element of a further group consisting of the second and the fourth capacitors 45, 67 and the second and the fourth resistor 63, 65.

The first and second impedance circuits 41, 42 allow a tuning of two times eight variables. FIG. 4B shows a possible implementation with tunable capacitors 45, 46, 66, 67 and tunable resistors 62 to 65 on both send and receive side. Optimization variables are the eight tunable elements, with possibly different values in upstream case (as shown) and in downstream case (then the transducers and the tuned elements are exchanged). An optimization goal is a nearly identical receive burst shape in upstream and downstream case.

FIG. 4B is just a possible implementation; number, type and connection of tuning elements can vary arbitrarily. The fourth number M of the TDCs and the comparators used is also not fixed, the method can work with only one TDC and only one comparator. The meter 10 uses a method to determine the optimal impedance: By optimizing the similarity of receive burst shapes, despite a remaining time difference DIFTOF. This time difference DIFTOF is the actual measurement result.

Thus, in a measurement phase, the control circuit 32 may set a first value of the variable impedance in the upstream mode A and a second value of the variable impedance in the downstream mode B. Alternatively, in the measurement phase, the control circuit 32 may set the same value of the variable impedance in the upstream mode A and in the downstream mode B.

It is also possible that only some circuit elements of the first and second impedance circuits 41, 42 are controllable; the other circuit elements are constant.

Figure 4C:
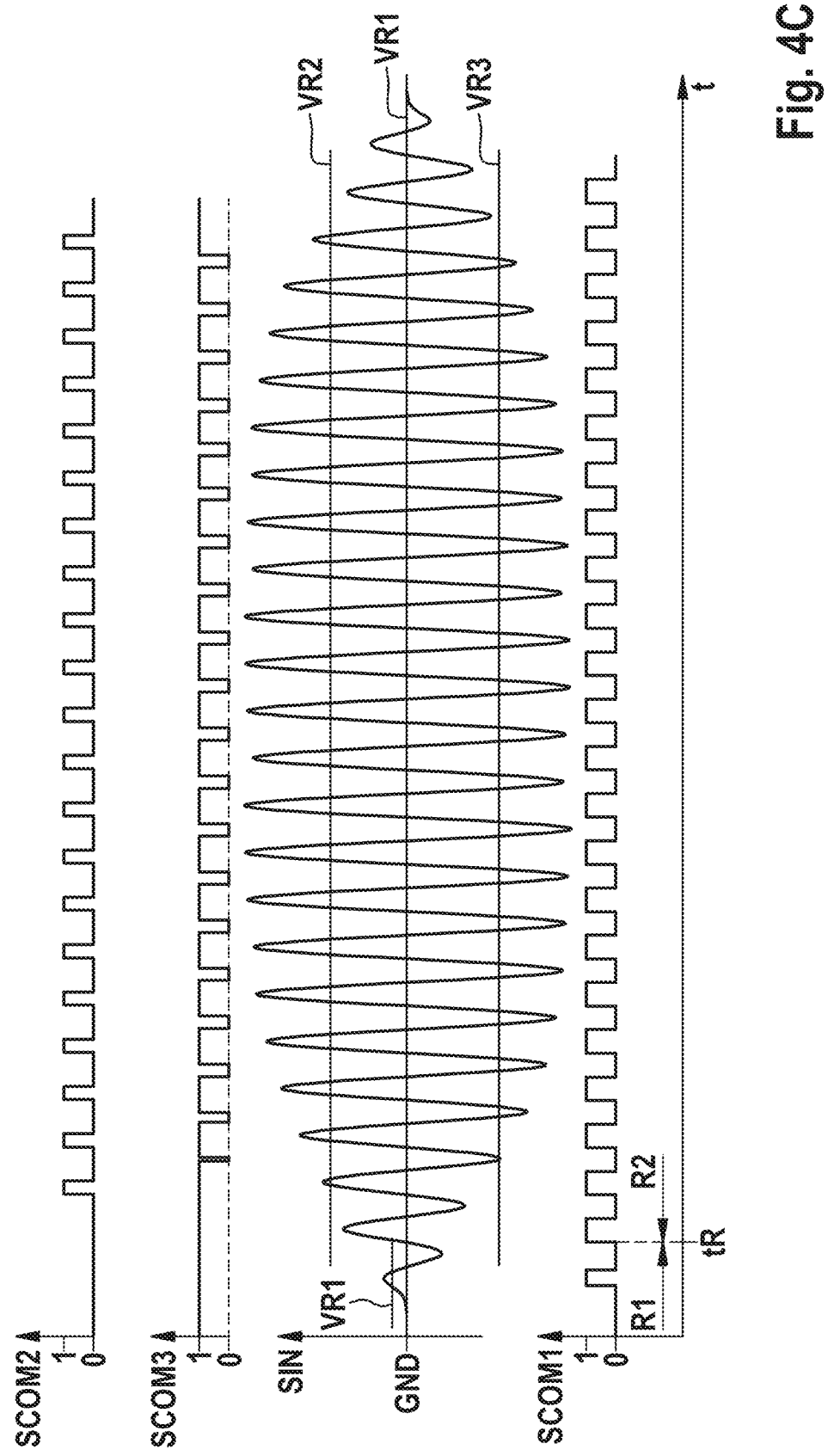

FIG. 4C shows an exemplary embodiment of signals generated by the meter 10 as shown in FIG. 4A or 4B. The second reference voltage VR2 has a positive value and the third reference voltage VR3 has a negative value with respect to the reference potential GND. In FIG. 4C the receive signal SIN and the fourth number M of comparator signals SCOM1 to SCOM3 are shown. In the exemplary embodiment of the meter 10, the fourth number M is three. The number of waves in the receive signal SIN is larger than the third number N of pulses of the output signal SOUT. The first transducer 11 together with the first impedance circuit 41, the second transducer 12 together with the second impedance circuit 42 and the medium between the two transducers 11, 12 form an oscillating system. As can be seen in FIG. 4C, the first comparator signal SCOM1 has a larger number of pulses in comparison to the second and the third comparator signal SCOM2, SCOM3. This results from the low analog values of the receive signal SIN at the first waves and also at the last waves of the receive signal SIN.

Both positive and negative slopes of the three comparator signals SCOM1 to SCOM3 are evaluated. It is advantageous to exclude noise from the evaluation, for example, by increasing the level of the first comparator 23 above the zero cross level. Other measures are also possible, e.g., using a delay for windowing or starting evaluation after one of the other comparators 51, 52 received a step signal.

Figure 4D:
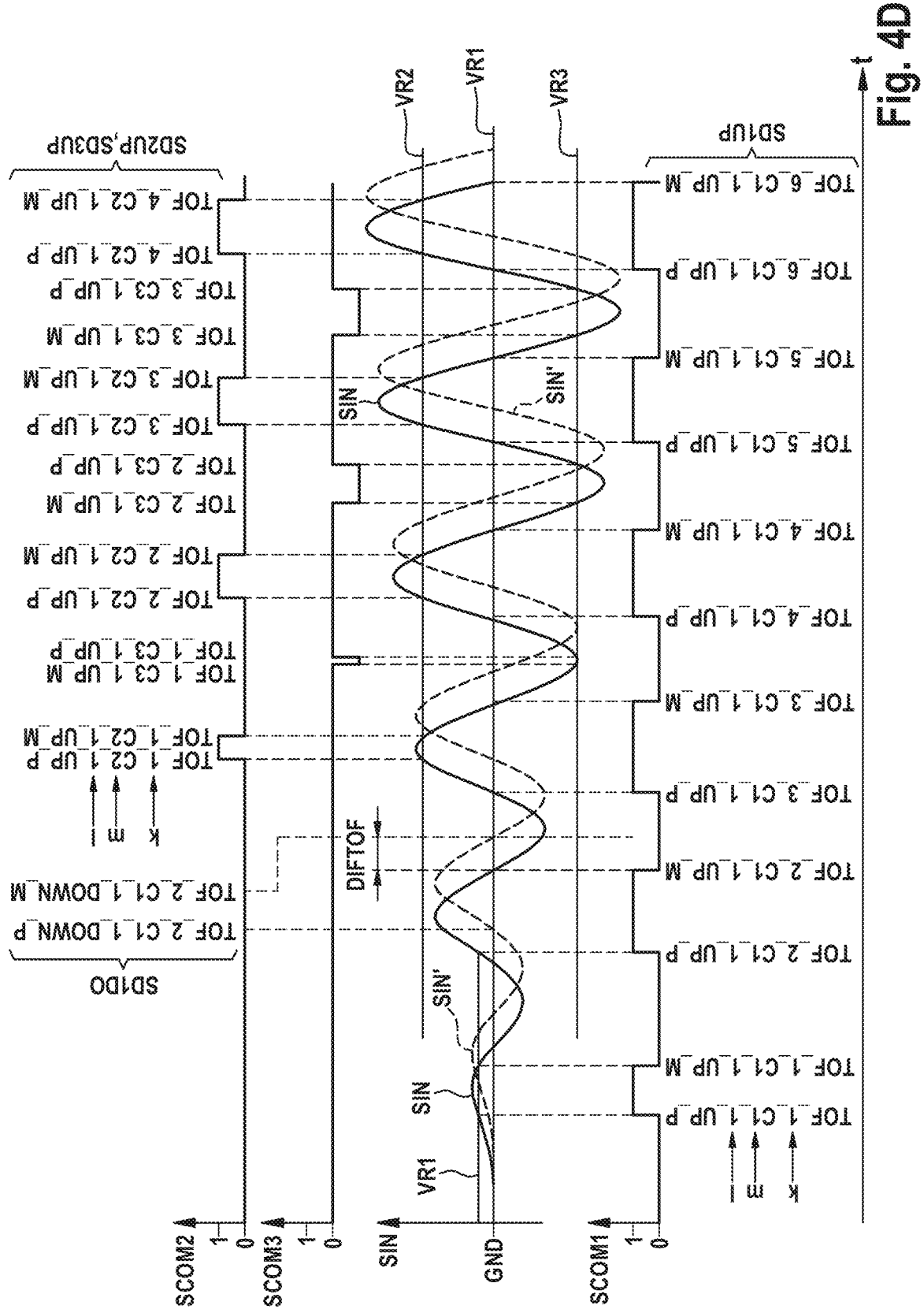

FIG. 4D shows a detail view of the signals shown in FIG. 4C. In FIG. 4D, the first to the third comparator signal SCOM1 to SCOM3 and the receive signals SIN in the upstream mode A and a receive signal SIN* in the downstream mode B are shown. Thus, the dashed signal is a sketch of the receive signal SIN* of the opposite measurement direction, featuring the time difference DIFTOF. The difference time DIFTOF only obtains a small value. FIG. 4D elucidates an exemplary embodiment how the edges of the three comparator signals SCOM1 to SCOM3 could be unambiguously named.

The time-to-digital converter 22 determines a value of the first to the third time signals SD1, SD2, SD3 at each rising edge and each falling edge of each of the pulses of the first to the third comparator signals SCOM1, SCOM2, SCOM3. The first comparator signal SCOM1 has the second number K of pulses. A variable k is used running from k=0 to k=K. In the upstream mode A, the first time signal SD1 is a first upstream time signal SD1UP. The values of the first time signal SD1UP referring to the rising edges of the pulses are marked with P. Also the falling edges of the pulses are converted into values of the first time signal SD1UP and are marked with M. The variables or names, such as TOF_1_C1_1_UP_P, TOF_1_C1_1_UP_M of the first time signal SD1UP are written at the corresponding falling or rising edges of the pulses in FIG. 4D. In the downstream mode B, the first time signal SD1 is a first downstream time signal SD1DO.

The converter 22 generates the first time signal SD1UP at each rising edge of a pulse of the first comparator signal SCOM1 (in FIG. 4D, the values are named TOF_1_C1_1_UP_P for the first pulse, TOF_2_C1_1_UP_P for the second pulse etc.) or each falling edge of a pulse of the first comparator signal SCOM1 (in FIG. 4D, the values are named TOF_1_C1_1_UP_M for the first pulse, TOF_2_C1_1_UP_M for the second pulse etc.). Correspondingly, in FIG. 4D, the values of the second time signal SD2UP at each rising edge of a pulse of the second comparator signal SCOM2 are named TOF_1_C2_1_UP_P for the first pulse, TOF_2_C2_1_UP_P for the second pulse etc.; and the values of the second time signal SD2UP at each falling edge of a pulse of the second comparator signal SCOM2 are named TOF_1_C2_1_UP_M for the first pulse, TOF_2_C2_1_UP_M for the second pulse etc. The values of the third time signal SD3UP are named correspondingly. These values are indicated for the upstream mode A.

In FIG. 4D, two values TOF_1_C1_1_DOWN_P, TOF_1_C1_1_DOWN_M of the first time signal SD1DO are indicated for the downstream mode B. All values shown in FIG. 4D are determined using a first impedance value of the first number L of impedance values of the variable impedance, thus l=1.

The ToF measurements as shown in FIG. 4D could be done for example by six TDC channels (e.g. by six inputs of the TDC 22). Looking at the shifted dashed signal, this receive signal SIN* features corresponding ToF measurements, which are globally shifted in time by the time difference DIFTOF. However, in real world systems the signal shape of upstream and downstream measurements are not perfectly fitting down to a picosecond level, as would be desired. Thus, the differences between corresponding points of the upstream receive signal SIN and the downstream receive signal SIN* are not equal to the time difference DIFTOF, but deviate from it according to lack of signal shape symmetry. In other words, and in an example for any arbitrarily picked pair of points, $$(TOF\_2\_C1\_1\_UP - TOF\_2\_C1\_1\_DOWN - DIFTOF)^2 < 0$$

wherein TOF_2_C1_1_UP is a value of the first time signal SD1UP for the second pulse (k=2) using the first comparator 23 (C1) in the upstream mode A (UP) and TOF_2_C1_1_DOWN is a value of the first time signal SD1DO for the second pulse (k=2) using the first comparator 23 (C1) in the downstream mode A (DOWN). For both values a first impedance value of the variable impedance is used (l=1). In the ideal case the term on the left side would be zero.

However, there are different methods at hand to increase signal symmetry, for example: Adding a (tunable) parallel capacitance 45, 46 in receive case to the receiving transducer 11, 12 (as shown in FIGS. 3A and 4B), or changing the resistive send impedance and/or receive impedance by tuning a resistor (as shown in FIG. 4B). This list is not exhaustive; in general, the meter 10 realizes a more symmetrical signal shape by applying a tuned parameter (parallel and/or series impedance, frequency) to the signal path. The meter 10 tunes the applied parameters automatically. Suitable parameter tuning is achieved by any optimization algorithm with the goal to minimize a sum f(l) over all differences of corresponding ToF values.

In case the meter 10 includes exactly one comparator, the following equation can be used in a calibration phase:

$$f(l)=\Sigma_{k=1}^{K}(TOF\_k\_C1\_l\_UP - TOF\_k\_C1\_l\_DOWN - DIFTOF)^2 \to 0,$$

wherein TOF_k_C1_l_UP is a value of the first upstream time signal SD1UP (measured in the upstream mode A) for a kth pulse of the first comparator signal SCOM1, TOF_k_C1_l_DOWN is a value of the first downstream time signal SD1DO (measured in the downstream mode B) for the kth pulse of the first comparator signal SCOM1 and k is an index indicating a pulse in the series of the number K of pulses and runs from 1 to K. Moreover, l is an index indicating the lth impedance value of the first number L of impendence values of the variable impedance.

In the calibration phase, the above mentioned sum f(l) is determined for each possible value or several values of the first number L of impendence values of the variable impedance, which is provided by the first and the second impedance circuits 41, 42. The optimum value of the first and the second impedance circuits 41, 42 is the value at which the sum f(l) obtains its minimum in the calibration phase and which will be used in the measurement phase following the calibration phase.

In case the meter 10 includes the fourth number M of comparators, the following equation can be used in the calibration phase:

$$f(l)=\Sigma_{k=1,m=1}^{K,M}(TOF\_k\_Cm\_l\_UP - TOF\_k\_Cm\_l\_DOWN - DIFTOF)^2 \to 0,$$

wherein TOF_k_Cm_l_UP is a value of a mth upstream time signal SDmUP (measured in the upstream mode A) for a kth pulse of the mth comparator signal SCOMm, TOF_k_Cm_l_DOWN is a value of a mth downstream time signal SDmDO (measured in the downstream mode B) for the kth pulse of the mth comparator signal SCOMm, k is an index indicating a pulse in the series of number K of pulses and runs from 1 to K, and m is an index indicating a comparator from the fourth number M of comparators and indicating the corresponding time signal SDmUP, SDmDO and runs from 1 to M (thus the identifiers run from C1 to CM). The index l is a value out of 1 to L.

Parameters of the optimization process are the values of the tunable hardware components mentioned above and the global time difference DIFTOF. At the optimum point, the optimized time difference DIFTOF is the desired measurement value, while the tuned impedances compensate asymmetries of the system and thus approach symmetrical receive signal shapes. Through the better signal symmetry, the optimized value of the time difference DIFTOF in particular features lower offset values than the corresponding measurement in a non-optimized system. The method is not restricted to the case DIFTOF=0, it can be applied at any flow.

Thus, the first and the second impedance circuits 41, 42 may obtain a first number L of possible impedance values. In the calibration phase, the control circuit 32 determines the time difference DIFTOF and the optimum impedance value out of the first number L of possible impedance values at which the sum f(l) obtains a minimum. In the calibration phase, the control circuit 32 stores information about the first and the second impedance control signals SI1, SI2 (which may be bus signals) that afterwards are used in the measurement phase.

In the equations above either the values of the first time signal SD1UP, SD1DO at the rising edge indicated with _P or the values at the falling edge indicated with _M or both values are used. The values of the second, the third or a further time signal SD2Up, SD2DO, SD3UP, SD3DO can be used in the same manner.

Advantageously, the optimization may be completely done in time domain, without analog-to-digital converter or fast Fourier transformation. This method of signal balancing is efficiently done based on TDC measurements in time domain.

The embodiments shown in the FIGS. 1 to 4D as stated represent exemplary embodiments of the improved ultrasonic flow meter, abbreviated meter; thus, they do not constitute a complete list of all embodiments according to the improved meter. Actual ultrasonic flow meter configurations may vary from the exemplary embodiments shown in terms of circuit parts, structures, shape, size and numbers, for example.

The invention claimed is:

1. An ultrasonic flow meter comprising:
   a first transducer and a second transducer;
   a first impedance circuit and a second impedance circuit, each of the first and second impedance circuits comprising a variable impedance;
   a first terminal coupled to the first transducer via the first impedance circuit;
   a second terminal coupled to the second transducer via the second impedance circuit;
   a signal generator with a signal output and a signal evaluation circuit with a signal input,
   wherein the signal output and the signal input are coupled to the first and second terminals, and
   wherein the signal evaluation circuit comprises a time-to-digital converter and a first comparator that couples the signal input to a first input of the time-to-digital converter; and
   a control circuit coupled to the signal generator, the signal evaluation circuit and the variable impedance, the control circuit being configured to set the ultrasonic flow meter in an upstream mode and in a downstream mode and to set an impedance value of the variable impedance as a function of a first upstream time signal generated by the time-to-digital converter in the upstream mode and of a first downstream time signal generated by the time-to-digital converter in the downstream mode.

2. The ultrasonic flow meter according to claim 1, wherein the variable impedance is configured to obtain one impedance value out of a number L of impedance values.

3. The ultrasonic flow meter according to claim 1, wherein the control circuit is configured to optimize the impedance value of the variable impedance such that the first upstream time signal and the first downstream time signal differ by a time difference.

4. The ultrasonic flow meter according to claim 1, wherein in the upstream mode, the first comparator is configured to generate a first comparator signal with a number K of pulses and the time-to-digital converter is configured to generate the first upstream time signal with the number K of values TOF_k_C1_1_UP corresponding to the number K of pulses of the first comparator signal, and
wherein in the downstream mode, the first comparator is configured to generate the first comparator signal with the number K of pulses and the time-to-digital converter is configured to generate the first downstream time signal with the number K of values TOF_k_C1_1_DOWN corresponding to the number K of pulses of the first comparator signal.

5. The ultrasonic flow meter according to claim 4, wherein the control circuit is configured to determine a time difference and an lth impedance value out of a number L of possible impedance values at which the following sum f(l) obtains a minimum:

$$f(l) = \sum_{k=1}^{K} \left( TOF_{k_{C1_{l_{UP}}}} - TOF_{k_{C1_{l_{DOWN}}}} - DIFTOF \right)^2,$$

wherein TOF_k_C1_1_UP is a value of the first upstream time signal generated at a kth pulse of the number K of pulses of the first comparator signal using the lth impedance value of the number L of impedance values of the variable impedance in the upstream mode, and
wherein TOF_k_C1_1_DOWN is a value of the first downstream time signal generated at the kth pulse of the number K of pulses of the first comparator signal using the lth impedance value of the number L of impedance values of the variable impedance in the downstream mode.

6. The ultrasonic flow meter according to claim 1, wherein the signal generator is configured to generate a square-wave signal having a number N of pulses.

7. The ultrasonic flow meter according to claim 1, wherein the signal evaluation circuit comprises at least a second comparator that couples the signal input to at least a second input of the time-to-digital converter.

8. The ultrasonic flow meter according to claim 1,
wherein the signal evaluation circuit comprises a number M of comparators,
wherein the control circuit is configured to determine a time difference and a lth impedance value out of a number L of possible impedance values at which the following sum f(l) obtains a minimum:

$$f(l) = \sum_{m=1}^{M} \left\{ \sum_{k=1}^{K} \left[ \left( TOF_{k_{Cm_{l_{UP}}}} - TOF_{k_{Cm_{l_{DOWN}}}} - DIFTOF \right)^2 \right] \right\},$$

wherein TOF_k_Cm_1_UP is a value of the first upstream time signal generated at a kth pulse of a number K of pulses of an mth comparator signal using the lth impedance value of the number L of impedance values of the variable impedance in the upstream mode, and
wherein TOF_k_Cm_1_DOWN is a value of the first downstream time signal generated at the kth pulse of the number K of pulses of the mth comparator signal using the lth impedance value of the number L of impedance values of the variable impedance in the downstream mode.

9. The ultrasonic flow meter according to claim 1,
wherein one of the first and second impedance circuits has the variable impedance with the impedance value that is set by the control circuit and the other one of the first and second impedance circuits is free of an impedance that has a variable impedance value, or
wherein the first impedance circuit comprises the variable impedance with the impedance value that is set by the control circuit and the second impedance circuit comprises a further variable impedance with a further impedance value that is set by the control circuit.

10. The ultrasonic flow meter according to claim 1,
wherein the first impedance circuit comprises a first capacitor with a first electrode connected to a first terminal of the first transducer and a second electrode connected to a second terminal of the first transducer, and
wherein the second impedance circuit comprises a second capacitor with a first electrode connected to a first terminal of the second transducer and a second electrode connected to a second terminal of the second transducer.

11. The ultrasonic flow meter according to claim 1, wherein the first transducer is an upstream transducer and the second transducer is a downstream transducer.

12. The ultrasonic flow meter according to claim 1,
wherein the ultrasonic flow meter comprises a switching circuit, and
wherein the signal output and the signal input are coupled to the first and second terminals by the switching circuit.

13. A method for ultrasonic flow metering, the method comprising:
operating an ultrasonic flow meter in an upstream mode and in a downstream mode by coupling a signal output of a signal generator and a signal input of a signal evaluation circuit to a first terminal and a second terminal; and
setting an impedance value of a variable impedance by a control circuit as a function of a first upstream time signal generated by a time-to-digital converter in the upstream mode and of a first downstream time signal generated by the time-to-digital converter in the downstream mode,
wherein each of a first impedance circuit and a second impedance circuit comprises the variable impedance,
wherein the first terminal is coupled to a first transducer via the first impedance circuit and the second terminal is coupled to a second transducer via the second impedance circuit, and
wherein the signal evaluation circuit comprises the time-to-digital converter and a first comparator that couples the signal input to a first input of the time-to-digital converter.

14. The method according to claim 13,
wherein, in the upstream mode, a switching circuit couples the signal output of the signal generator to the first terminal and couples the signal input of the signal evaluation circuit to the second terminal, and wherein, in the downstream mode, the switching circuit couples the signal output of the signal generator to the second terminal and couples the signal input of the signal evaluation circuit to the first terminal.

* * * * *

UNITED STATES PATENT AND TRADEMARK OFFICE
CERTIFICATE OF CORRECTION

| | | |
|---|---|---|
| PATENT NO. | : 12,339,148 B2 | Page 1 of 1 |
| APPLICATION NO. | : 17/905812 | |
| DATED | : June 24, 2025 | |
| INVENTOR(S) | : Kern et al. | |

It is certified that error appears in the above-identified patent and that said Letters Patent is hereby corrected as shown below:

In the Specification

Column 14, Lines 60-61; delete "$(TOF\_2\_C1\_1\_UP - TOF\_2\_C1\_1\_DOWN - DIFTOF)^2 < 0$" and insert --$(TOF\_2\_C1\_1\_UP - TOF\_2\_C1\_1\_DOWN - DIFTOF)^2 > 0$--.

Column 15, Lines 20-21; delete "$f(l) = \Sigma_{k=1}^{K}(TOF\_k\_C1\_l\_UP - TOF\_k\_C1\_l\_DOWN - DIFTOF)^2 \to 0$," and insert --$f(l) = \sum_{k=1}^{K}(TOF\_k\_C1\_l\_UP - TOF\_k\_C1\_l\_DOWN - DIFTOF)^2 \to 0$,--.

In the Claims

Claim 5, Column 17, Lines 23-28; delete "$f(l) = \sum_{k=1}^{K}\left(TOF_{k_{C1_{l_{UP}}}} - TOF_{k_{C1_{l_{DOWN}}}} - DIFTOF\right)^2,$" and insert --$f(l) = \sum_{k=1}^{K}(TOF\_k\_C1\_l\_UP - TOF\_k\_C1\_l\_DOWN - DIFTOF)^2$,--

Column 8, Column 17, Lines 55-59; delete "$f(l) = \sum_{m=1}^{M}\left\{\sum_{k=1}^{K}\left(TOF_{k_{Cm_{l_{UP}}}} - TOF_{k_{Cm_{l_{DOWN}}}} - DIFTOF\right)^2\right\},$" and insert --$f(l) = \sum_{m=1}^{M} \left\{ \sum_{k=1}^{K}(TOF\_k\_Cm\_l\_UP - TOF\_k\_Cm\_l\_DOWN - DIFTOF)^2 \right\}$--

Signed and Sealed this
Second Day of September, 2025

Coke Morgan Stewart
*Acting Director of the United States Patent and Trademark Office*